United States Patent [19]

Eknayan

[11] 4,203,108
[45] May 13, 1980

[54] UNDERWATER DETECTION SYSTEM

[76] Inventor: Hrant Eknayan, 7528 Colombia St., South San Gabriel, Calif. 91770

[21] Appl. No.: 135,399

[22] Filed: Aug. 18, 1961

[51] Int. Cl.$^2$ ............................................. H04B 13/02
[52] U.S. Cl. ..................................... 340/850; 356/141
[58] Field of Search ................... 340/3, 4, 5, 8 RT, 6, 340/850; 88/1 U, DIG. 44, 1 HV; 343/5; 356/141, 152

[56] References Cited

U.S. PATENT DOCUMENTS

| | | | |
|---|---|---|---|
| 2,237,193 | 4/1941 | Mobsby | 340/4 |
| 2,379,496 | 7/1945 | Saunier, Jr. | 88/1 |
| 2,401,929 | 6/1946 | Hammond, Jr. | 340/850 |
| 2,409,030 | 10/1946 | Fraenckel et al. | 88/1 |
| 2,859,652 | 11/1958 | Hopgood | 88/1 |
| 2,930,278 | 3/1960 | Hansen et al. | 88/1 |
| 2,964,636 | 12/1960 | Cary | 250/211 |
| 2,968,987 | 1/1961 | Knopow | 340/3 |

*Primary Examiner*—Richard A. Farley

*Attorney, Agent, or Firm*—Richard S. Sciascia; Joseph M. St. Amand; T. M. Phillips

EXEMPLARY CLAIM

1. A system for detecting the presence and position of submerged objects below the ocean surface, comprising in combination, means for projecting a beam of electromagnetic rays falling within the 0.4800 to 0.5800 micron wave band in the direction of an object to be detected, a receiver for receiving rays reflected from an object in the path of said projected beam, said receiver comprising a spherically shaped body having an aperture formed in the area which is in contact with the ocean water to permit said reflected rays to enter and impinge on the inner surface of said spherically shaped body, inlet and outlet means for circulating dry cooled constant temperature nitrogen in said spherically shaped body under sufficient pressure to prevent ocean water from entering said spherically shaped body, and a plurality of lead sulfide cells mounted on the inner surface of said sphere for generating an output signal proportional to the intensity and angle of entry of the reflected rays.

1 Claim, 5 Drawing Figures

UNDERWATER DETECTION SYSTEM

The invention herein described may be manufactured and used by or for the Government of the United States of America for governmental purposes without the payment of any royalties thereon or therefor.

The present invention relates to an underwater detection system and more particularly to an underwater detection system which utilizes a light source of 0.4800 to 0.5800 micron wavelengths to illuminate a target. There are several known underwater detection systems as for example sonobuoy detection systems and magnetic airborne detection systems. The first of these systems suffers from the disadvantages of being elaborate in that many transducers are necessary to obtain a sufficient signal strength and the cooperating aircraft has to travel many miles to screen a given locality. Further, as searching in the water is done by the use of acoustical energy, interfering noises in the water are always present. The second system is elaborate and at the same time has poor sensitivity.

Accordingly, an object of the present invention is to provide an underwater detection system which overcomes the disadvantages of known systems.

Another object of the invention is to provide an underwater detection system which is simple in construction, easy to operate and is not troubled by underwater noise.

A further object is to provide an underwater detection system which utilizes a light source for illuminating a target and a light detecting device which is relatively simple in construction.

Still another object of the invention is to provide an underwater detection system which utilizes a light source of 0.4800 to 0.5800 microns wavelength to illuminate a target and a light sensing device which is simple in construction.

Still a further object is to provide an underwater detection system wherein detection is done by a searching aircraft flying at a height of about 100 to 300 feet and at a speed of about 90 to 140 miles per hour.

Still another object is to provide an underwater detection system which can detect submerged submarines up to 500 feet in depth below the surface of the ocean.

Other objects and many of the attendant advantages of this invention will become readily appreciated as the same becomes better understood by reference to the following detailed description when considered in connection with the accompanying drawings wherein.

Figures 1, 2, 3, 4, 5:
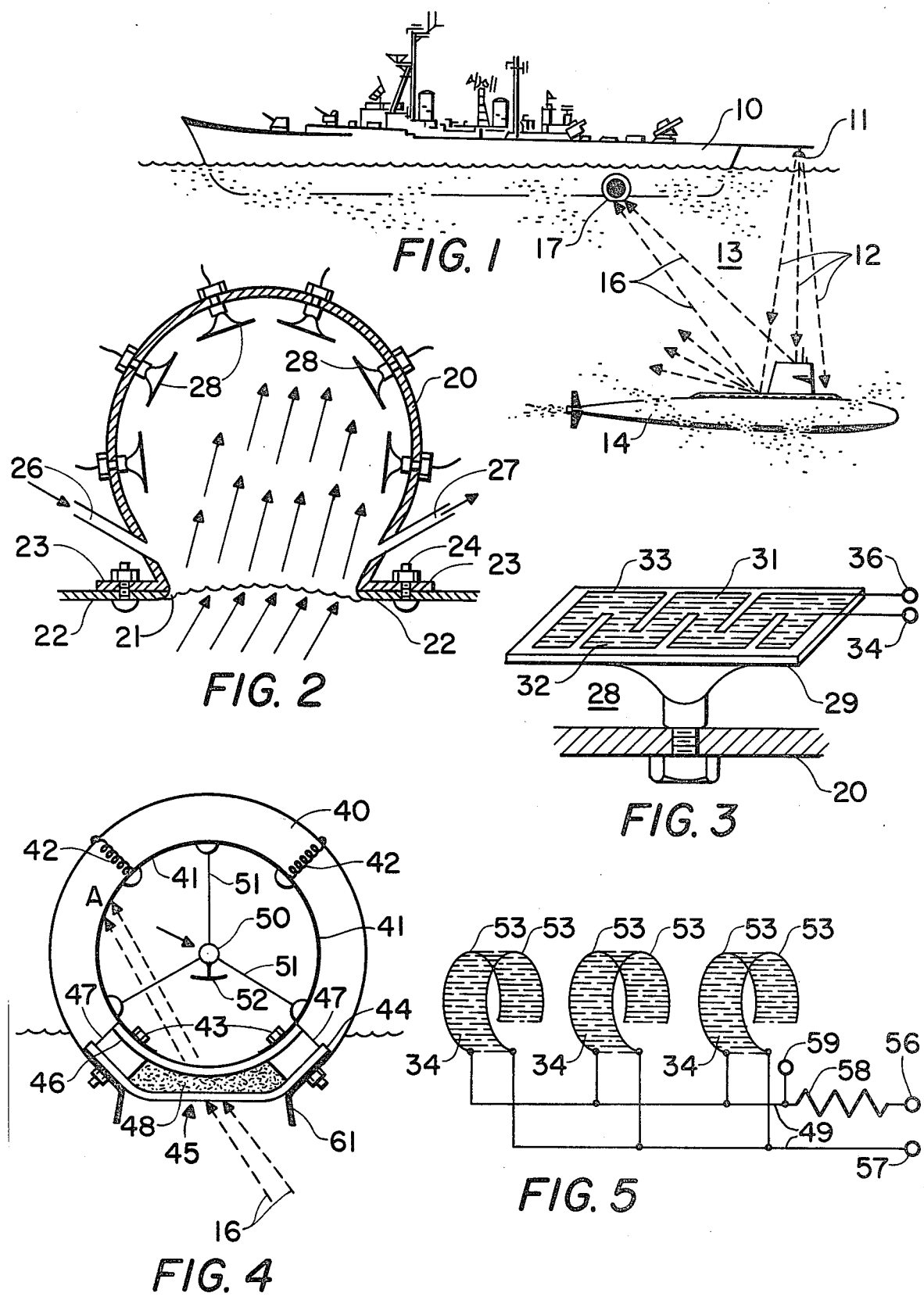
FIG. 1 illustrates diagrammatically one mode of operation of the invention.
FIG. 2 shows the structural arrangement of the detecting device used in conjunction with the operation of FIG. 1.
FIG. 3 is a closeup view of the detecting element utilized in the devices of FIG. 2.
FIG. 4 shows the structural arrangement of a second detecting device which may be used in a different mode of operation from that of FIG. 1.
FIG. 5 shows a schematic diagram of the detector for the detecting device of FIG. 4.

Referring now to the drawings there is shown in FIG. 1 a ship 10 having a light source 11 mounted thereon so that the light rays 12 are directed through the water 13 to impinge on the upper surface of a submerged submarine 14. Reflected light rays 16 are then detected by detector 17 mounted in the hull of ship 10.

Light source 11 may be a high pressure zenon arc discharge with color correcting filters in front to pass only wavelengths of 0.4800 to 0.5800 microns, a high pressure mercury enclosed arc discharge, or a Thalium or Selenium vapor enclosed arc discharge with a rare gas.

Detector 17 is shown in more detail in FIG. 2. A spherical shell 20 is mounted over an aperture 21 in the hull 22 of ship 10 by means of a flange 23 and bolts 24 to provide an airtight seal between flange 23 and hull 22. Dry cooled constant temperature nitrogen is circulated through the inside of shell 20 by means of inlet 26 and outlet 27 under sufficient pressure to prevent ocean water from entering through aperture 21. Detectors 28 are mounted on the interior of shell 20 by means of a nut and bolt arrangement shown in FIG. 3. The direction and intensity of the reflected light rays entering aperture 21 will determine which of detectors 28 will produce a signal, thus, the direction of the object from which light rays are reflected is known. Element 28 consists of a non-heat conducting base 29 on which a thin film of lead sulfide 31 or other suitable material is deposited between electrodes 32, 33. Electrodes 32, 33 may be gold plating on panel 29 and connected to a source of bias voltage not shown by means of terminals 34, 36. The surface of elements 28 may be covered with a thin coat of clear polystyrene to protect them from the salt water.

Elements 28 should be equally spaced on the inside of the sphere and mounted to extend about two inches from hull 20. Terminals 34, 36 may be connected in any suitable manner to an indicating device or amplifier-detector (not shown) to indicate the change in resistance between electrodes 32 and 33 of elements 28 caused from a change in light intensity received from a light reflecting object.

Referring to FIG. 4 there is shown a sphere similar to that shown in FIG. 2 having an outer sphere 40. A sphere 41 made of rubber or other suitable material containing low pressure argon is mounted inside outer sphere 40 by means of mounting springs 42 made of metal or rubber and mounting bolts 43. A lens assembly 45 consisting of two clear sheets of plastic 44, 46 separated by ring washers or separators 47 and filled with a colored filter fluid 48 is mounted in concentric apertures of the spheres 40 and 41 by means of mounting bolts 43. Separators 47 may be made of aluminum or other suitable material and also provide an airtight seal between inner sphere 41 and outer sphere 40. Part of the air is removed from the space between sphere 40 and sphere 41 to provide a partial vacuum, thus preventing a loss of heat by conduction. Detector 50 which may be of the lead sulfide type is suspended at the center of sphere 41 by means of rubber tubing 51 which also serves to insulate lead wires 49 (shown in FIG. 5) from detector 50. A metal shield 52 is provided to prevent background radiation and the water temperature from affecting detector 50. Shield 61 surrounds the opening of lens assembly 45 to prevent scattered light from entering. As shown in FIGS. 4 and 5 detector 50 is a sphere which may be made of ceramic or other suitable material having conducting electrodes 53 deposited thereon. Bands 34 of lead sulfide are deposited between conducting electrodes 53. A bias voltage at terminals 56, 57 is applied to electrodes 53 through a load resistor 58. The output signal from detector 50 is taken from terminal 59 across load resistor 58.

In operation light beam 16 of very minute light coming from the outside surface of submarine 14 enters rubber sphere 41 through lens assembly 45 and strikes the inner surface at the area A. The portion of detector 50 facing area A receives heat from that area caused by light beam 16 impinging thereon. When detector 50 is mounted in a buoy as shown in FIG. 4 light source 11 would be mounted in an aircraft, not shown, and the detected signal is radiated to the aircraft by means of a radio transmitter which could be located in separators 47.

Detector 50 may also be mounted in a balloon suspended above a forest to detect forest fires.

Obviously many modifications and variations of the present invention are possible in the light of the above teachings. It is therefore to be understood that within the scope of the appended claims the invention may be practiced otherwise than as specifically described.

What is claimed is:

1. A system for detecting the presence and position of submerged objects below the ocean surface, comprising in combination, means for projecting a beam of electromagnetic rays falling within the 0.4800 to 0.5800 micron wave band in the direction of an object to be detected, a receiver for receiving rays reflected from an object in the path of said projected beam, said receiver comprising a spherically shaped body having an aperture formed in the area which is in contact with the ocean water to permit said reflected rays to enter and impinge on the inner surface of said spherically shaped body, inlet and outlet means for circulating dry cooled constant temperature nitrogen in said spherically shaped body under sufficient pressure to prevent ocean water from entering said spherically shaped body, and a plurality of lead sulfide cells mounted on the inner surface of said sphere for generating an output signal proportional to the intensity and angle of entry of the reflected rays.